US006832195B2

(12) United States Patent
Johnson

(10) Patent No.: US 6,832,195 B2
(45) Date of Patent: Dec. 14, 2004

(54) SYSTEM AND METHOD FOR ROBUSTLY DETECTING VOICE AND DTX MODES

(75) Inventor: Phillip Marc Johnson, Raleigh, NC (US)

(73) Assignee: Sony Ericsson Mobile Communications AB (SE)

( * ) Notice: Subject to any disclaimer, the term of this patent is extended or adjusted under 35 U.S.C. 154(b) by 221 days.

(21) Appl. No.: 10/190,116

(22) Filed: Jul. 3, 2002

(65) Prior Publication Data

US 2004/0006462 A1 Jan. 8, 2004

(51) Int. Cl.$^7$ .......................... G10L 11/06; G10L 21/00
(52) U.S. Cl. ..................... 704/270; 704/275; 370/468; 455/63.1; 455/296
(58) Field of Search ............................... 704/270, 275, 704/500, 501, 502, 503, 504, 233; 370/462, 468; 455/63.1, 296; 375/346

(56) References Cited

U.S. PATENT DOCUMENTS

| | | | | |
|---|---|---|---|---|
| 6,035,179 A | * | 3/2000 | Virtanen | 455/63.1 |
| 6,097,772 A | * | 8/2000 | Johnson et al. | 375/346 |
| 6,424,942 B1 | * | 7/2002 | Mustel et al. | 704/233 |
| 6,452,941 B1 | * | 9/2002 | Bruhn | 370/468 |
| 6,535,521 B1 | * | 3/2003 | Barghouti et al. | 370/462 |

FOREIGN PATENT DOCUMENTS

| | | |
|---|---|---|
| WO | WO 99/27745 | 6/1999 |
| WO | WO 00/31996 | 6/2000 |

OTHER PUBLICATIONS

ETSI: "Digital Cellular Telecommunications System (Phase 2+); Discontinuous Transmission (DTX) for Adaptive Multi-Rate (AMR) Speech Traffic Channels (3GPP TS 06.93 version 7.5.0 Release 1998)", ETSI TS 101 707 V7.5.0 Dec. 2000, pp. 1–15. XP002256638.

ETSI: "Digital Cellular Telecommunications System (Phase 2+); Comfort Noise Aspects for Adaptive Mlti–Rate (AMR) Speech Traffic Channels (GSM 06.92 version 7.1.1 Release 1998)", ETSI EN 301 706 V7.1.1 Dec. 1999, pp. 1–13, XP002256639.

* cited by examiner

Primary Examiner—Susan McFadden
(74) Attorney, Agent, or Firm—Moore & Van Allen PLLC; Gregory A. Stephens

(57) ABSTRACT

A system and method of determining whether a receiver in active (non-DTX) mode should remain in active (non-DTX) mode or switch to inactive (DTX) mode and vice versa. For switching from non-DTX to DTX mode in a receiver, a received AMR frame is subjected to a SID_FIRST marker comparison. If the results of the SID_FIRST marker comparison exceed a SID_FIRST threshold, then the received AMR frame is processed as a SID_FIRST frame and the receiver is switched to DTX mode. Otherwise, the received AMR frame is subjected to a SID_UPDATE marker comparison. If the results of the SID_UPDATE marker comparison exceed a SID_UPDATE threshold, then the received AMR frame is processed as a SID_UPDATE frame and the receiver is switched to DTX mode. Otherwise, the received AMR frame is processed as a voice frame in non-DTX mode. For switching from DTX to non-DTX mode in a receiver, a received AMR frame in DTX mode is subjected to an ONSET frame comparison. If the results of the ONSET frame comparison exceed a threshold, then the received AMR frame is processed as an ONSET frame and the receiver is switched to non-DTX mode. Otherwise, the received AMR frame is subjected to a SID_UPDATE marker comparison. If the results of the SID_UPDATE marker comparison exceed a threshold, then the received AMR frame is processed as a SID_UPDATE frame and the receiver remains in inactive DTX mode. Otherwise, it is determined whether the received AMR frame is a voice frame, and if so, the receiver is switched to non-DTX mode, and if not, the received AMR frame is classified as a NO_DATA frame and the receiver remains in inactive DTX mode.

28 Claims, 12 Drawing Sheets

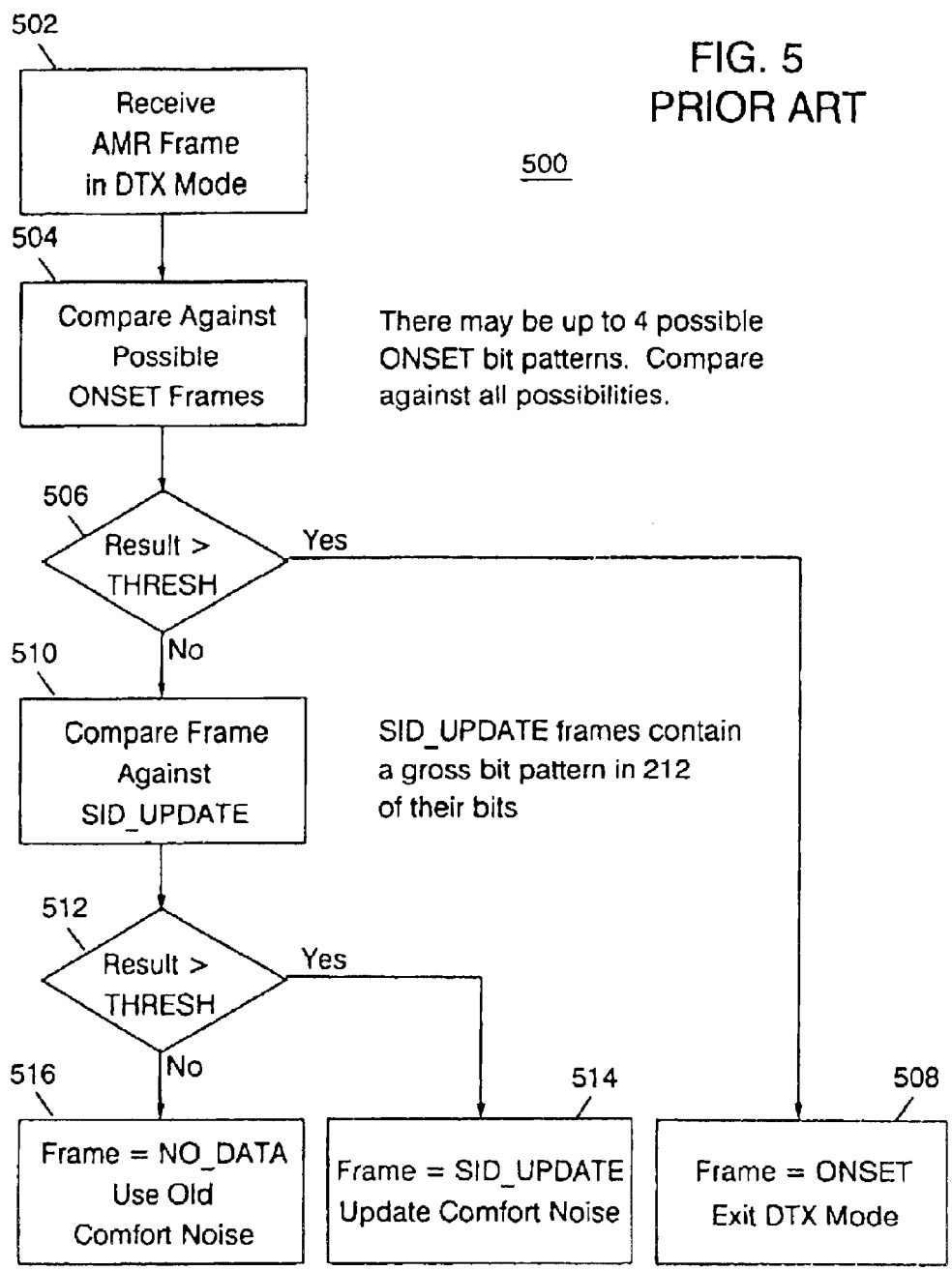

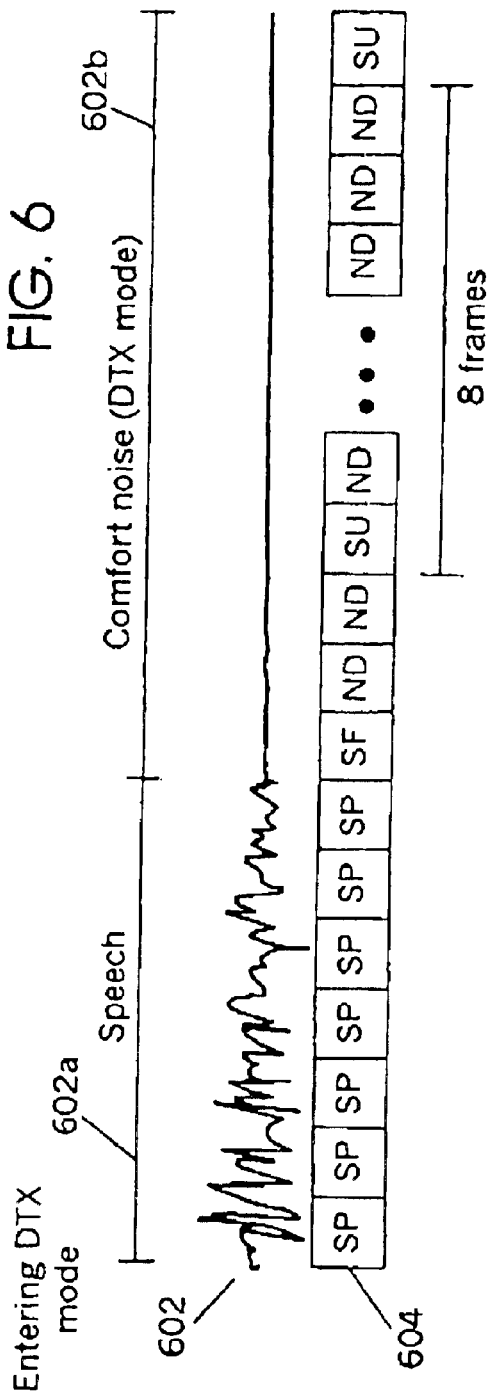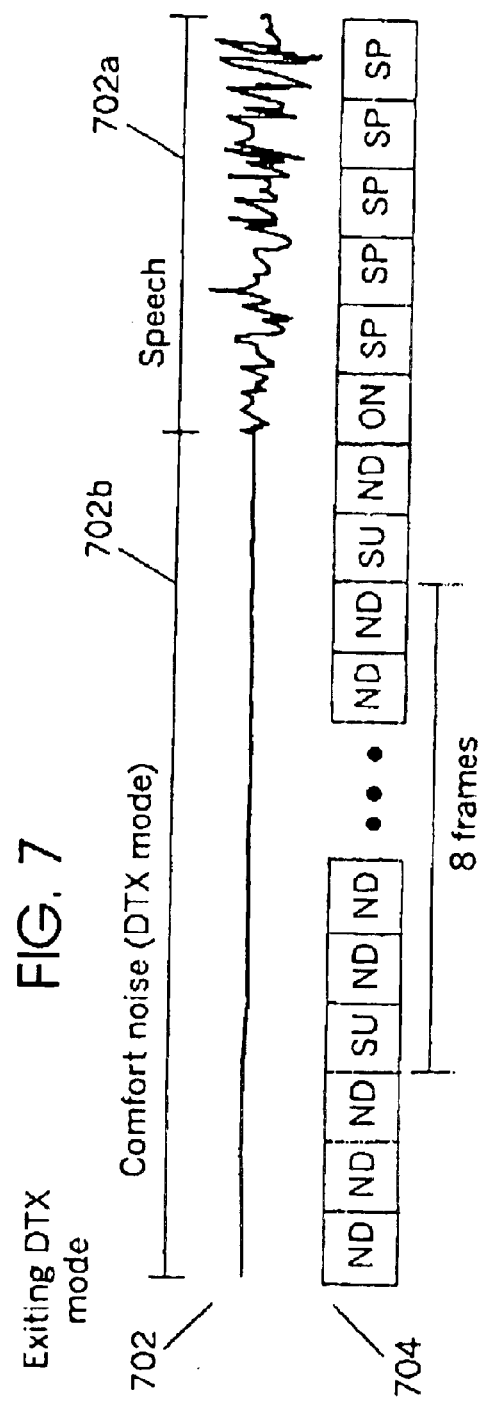

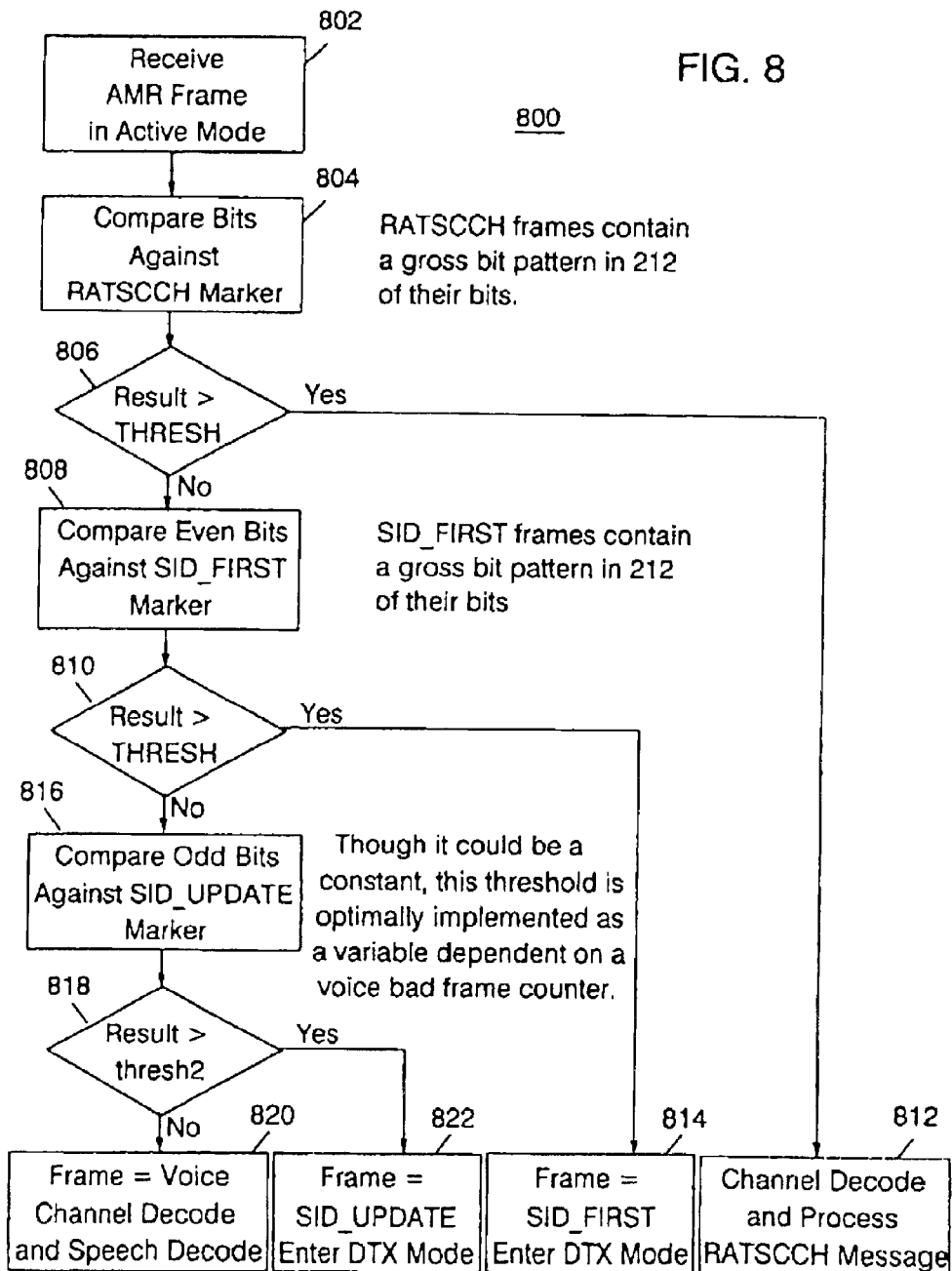

SYSTEM AND METHOD FOR ROBUSTLY DETECTING VOICE AND DTX MODES

The following acronyms are used throughout this description. They are listed in TABLE 1 below for ease of reference.

TABLE 1

| ACRONYM | Definition |
|---|---|
| ACELP | Algebraic Code Excited Linear Prediction |
| ACS | Active Codec Set |
| AFS | AMR Full rate Speech codec |
| AHS | AMR Half rate Speech codec |
| AMR | Adaptive Multi Rate speech codec |
| BER | Bit Error Rate |
| BSS or BTS | Base Station Subsystem/Base Transceiver Station |
| CDMA | Code Division Multiple Access |
| C/I | Carrier-to-Interference ratio (used to measure link quality) |
| CMI | Codec Mode Indication (speech rate used on attached link) |
| CMC | Codec Mode Command (speech rate commanded to be used by an MS on its uplink) |
| CMR | Codec Mode Request (speech rate requested by an MS to be used on its receiving link) |
| CRC | Cyclic Redundancy Check |
| DFI | Dangerous Frame Indicator |
| DTX | Discontinuous Transmission |
| EDGE | Enhanced Data-rates for GSM (or Global) Evolution |
| EFR | Enhanced Full Rate speech codec for GSM |
| EVRC | Enhanced Variable-Rate Codec, used in IS-95 CDMA |
| FACCH | Fast Associated Control Channel |
| FR | Full Rate speech codec for GSM |
| GSM | Global System for Mobile communications, common digital cellular standard |
| HR | Half Rate speech codec for GSM |
| MS | Mobile station, e.g. a cellular phone |
| NO_DATA | Frame classification used to indicate no speech-related data received, e.g. during DTX |
| ONSET | AMR frame used to demark the end of a DTX period, i.e. start active voice |
| PDC | Personal Digital Cellular, Japanese digital cellular standard |
| RATSCCH | Robust AMR Traffic Synchronized Control Channel |
| SID | Silence Description or Descriptor |
| SID_FIRST | AMR frame type used to demark the beginning of a DTX period |
| SID_UPDATE | AMR frame used to convey comfort noise characteristics during a DTX period |
| TDMA | Time Division Multiple Access, common digital cellular standard |
| TRAU | Transcoding and Rate Adapting Unit |
| WCDMA | Wideband CDMA |
| 3GPP | 3$^{rd}$ Generation Partnership Project, WCDMA standard |

BACKGROUND OF THE INVENTION

Digital communications systems, such as digital cellular telephony systems, are often used to transmit voice. Due to the limited bandwidth of these systems, speech is typically encoded to a low bit rate using a speech encoder. Various methods are in use for such speech coding. Within modern digital cellular telephony, most of these methods are based upon Code Excited Linear Prediction (CELP) or some variant thereof. Such speech codecs are standardized and in use for all of the major digital telephony standards including GSM/EDGE, PDC, TDMA, CDMA, and WCDMA.

The present invention is described within the context of GSM. Within this standard, there are currently four standardized speech codecs; three of which are fielded and in common use. The original speech codec is known as the full-rate (FR) codec. This was followed by the half-rate (HR) speech codec which required only half of the bandwidth of the FR codec thereby allowing cellular operators to support twice as many users within the same frequency allocation. This was followed by the Enhanced Full Rate (EFR) speech codec which required the same net bit rate (after channel coding) as the original FR codec but with much improved speech quality.

The GSM standard recently introduced the AMR speech codec. This speech codec will also be used in forthcoming EDGE and 3GPP cellular systems. A similar ACELP-based adaptable speech codec known as the EVRC has been standardized for IS-95 (narrowband) CDMA.

The present invention relates to the Adaptive Multi-Rate (AMR) speech codec. In broad terms, the invention improves the audio quality perceived within an AMR enabled receiver. More particularly, the invention serves to prevent two specific problems that can occur when an AMR enabled receiver is entering or exiting DTX mode. The first problem is that the link may enter DTX but the receiver may not recognize this state change. The result is that random data may be processed by the speech decoder during the DTX period leading to audible artifacts such as clicks and pops. The second problem is that a link in the DTX state may return to active voice but the AMR enabled receiver may not recognize this. The result is that the receiver is muted despite the active state of the link.

BRIEF SUMMARY OF THE INVENTION

One embodiment of the present invention comprises a method of determining whether a receiver in active (non-DTX) mode should remain in active (non-DTX) mode or switch to inactive (DTX) mode. A received AMR frame in active (non-DTX) mode is subjected to a RATSCCH marker comparison. If the results of the RATSCCH marker comparison exceed a RATSCCH marker threshold, the received AMR frame is processed as a RATSCCH message. Otherwise, the received AMR frame is subjected to a SID_FIRST marker comparison. If the results of the SID_FIRST marker comparison exceed a SID_FIRST threshold, then the received AMR frame is processed as a SID_FIRST frame and the receiver is switched to DTX mode. Otherwise, the received AMR frame is subjected to a SID_UPDATE marker comparison. If the results of the SID_UPDATE marker comparison exceed a SID_UPDATE threshold, then the received AMR frame is processed as a SID_UPDATE frame and the receiver is switched to DTX mode. Otherwise, the received AMR frame is processed as a voice frame in active (non-DTX) mode.

The SID_UPDATE threshold is determined by channel decoding the received AMR frame as a voice frame and performing a CRC test on the channel decoded AMR frame. If the CRC test passes, then a badFrameCounter variable is set to zero, otherwise the badFrameCounter is incremented by one; and the SID_UPDATE threshold is set according to the badFrameCounter.

Another embodiment of the present invention comprises a method of determining whether an AMR enabled receiver in inactive (DTX) mode should remain in inactive (DTX) mode or switch to active (non-DTX) mode. A received AMR frame in inactive (DTX) mode is subjected to an ONSET frame comparison. If the results of the ONSET frame comparison exceed a threshold, then the received AMR frame is processed as an ONSET frame and the receiver is switched to active (non-DTX) mode. Otherwise, the received AMR frame is subjected to a SID_UPDATE marker comparison. If the results of the SID_UPDATE marker comparison exceed a threshold, then the received AMR frame is processed as a SID_UPDATE frame and the receiver remains in inactive (DTX) mode. Otherwise, it is determined whether the received AMR frame is a voice frame, and if so, the receiver is switched to active (non-DTX) mode, and if not, the received AMR frame is classified as a NO_DATA frame and the receiver remains in inactive (DTX) mode.

There are several alternative processes for determining whether the received AMR frame is a voice frame. One method comprises channel decoding the received AMR frame as a voice frame and performing a CRC test on the channel decoded AMR frame. If the CRC test fails, then the received AMR frame is classified as a NO_DATA frame. If the CRC test passes, then a goodFrameCount variable is incremented by one. The goodFrameCount variable is compared against a threshold value and if the goodFrameCount variable exceeds the threshold value, then the received AMR frame is classified as a voice frame. Otherwise the received AMR frame is classified as a NO_DATA frame.

Another method comprises determining if the received AMR frame is a SID_FIRST frame, and if so, setting a framesSinceSID variable to zero and considering the received AMR frame as NO_DATA for purposes of speech decoding. Otherwise, it is determined if the received AMR frame is a SID_UPDTAE frame, and if so, setting the framesSinceSID variable to zero and considering the received AMR frame as NO_DATA for purposes of speech decoding. If the received AMR frame is neither a SID_FIRST or SID_UPDTAE frame then the framesSinceSID variable is incremented by one. Next, it is determined whether the framesSinceSID variable exceeds a threshold, and if not, the received AMR frame is classified as NO_DATA. Otherwise, the received AMR frame is channel decoded as a voice frame and a CRC test is performed on the channel decoded AMR frame. If it passes, the received AMR frame is classified as a voice frame, otherwise the received AMR frame is classified as a NO_DATA frame.

Yet another method of determining whether the received AMR frame is a voice frame comprises channel decoding the received AMR frame as a voice frame and performing a CRC test on the channel decoded AMR frame. If it fails, the received AMR frame is classified as a NO_DATA frame. If it passes the CRC test, then it is subjected to a Viterbi metric threshold test. If it passes the Viterbi metric threshold test, the received AMR frame is classified as a voice frame, otherwise the received AMR frame is classified as a NO_DATA frame.

Still another method of determining whether the received AMR frame is a voice frame comprises performing a carrier-to-interference (C/I) metric threshold test on the received AMR frame. If it fails the C/I metric threshold test, the received AMR frame is classified as a NO_DATA frame, otherwise the received AMR frame is channel decoded as a voice frame and subjected to a CRC test. If it passes the CRC test, the received AMR frame is classified as a voice frame, otherwise the received AMR frame is classified as a NO_DATA frame.

Still another method comprises performing an inband bit correlation metric threshold test on the received AMR frame. If it fails the inband bit correlation metric threshold test, the received AMR frame is classified as a NO_DATA frame. Otherwise, the received AMR frame is channel decoded and a CRC test is performed. If it passes the CRC test, the received AMR frame is classified as a voice frame, otherwise the received AMR frame is classified as a NO_DATA frame.

It should be noted that the term "receiver" as used herein refers to the receiving portion of a cellular transceiving device. A cellular transceiving device includes both a mobile terminal as well as a base station. A mobile terminal must be in communication with a base station in order to place or receive a call. There are numerous protocols, standards, and speech codecs that can be used for wireless communication between a mobile terminal and a base station.

While the present invention is described herein in the context of a mobile terminal, the term "mobile terminal" may include a cellular radiotelephone with or without a multi-line display; a Personal Communications System (PCS) terminal that may combine a cellular telephone with data processing, facsimile and data communications capabilities; a Personal Digital Assistant (PDA) that can include a radiotelephone, pager, Internet/intranet access, Web browser, organizer, calendar and/or a global positioning system (GPS) receiver; and a conventional laptop and/or palmtop receiver or other computer system that includes a display for GUI. Mobile terminals may also be referred to as "pervasive computing" devices.

BRIEF DESCRIPTION OF THE DRAWINGS

FIG. 5 (prior art) illustrates a flow chart describing the AMR frame classification process when in DTX mode.

FIG. 6 illustrates the AMR frame structure of a typical audio signal as it transitions from speech to DTX mode.

FIG. 7 illustrates the AMR frame structure of a typical audio signal as it transitions from DTX to speech mode.

FIG. 8 illustrates a flow chart describing active mode (non-DTX) frame classification processing according to an embodiment of the present invention.

DETAILED DESCRIPTION OF THE INVENTION

Basic AMR Operation

The AMR speech codec is fundamentally different from fixed-rate codecs in that multiple speech rates are defined and the speech rate may be changed dynamically. For each speech rate, a channel coding scheme is defined. The speech rate may be altered in order to match the channel coding to the link quality. There is both a half-rate and full-rate mode of AMR operation.

The AMR speech codec has capacity and speech quality advantages over preceding GSM speech codecs. The capacity increase is largely a consequence of there existing a half-rate option in addition to the full rate. Because the ACELP technology underlying the AMR codec is superior to that of the original HR speech codec, the AMR half rate codec will likely be acceptable with respect to speech quality (unlike its HR predecessor).

The adaptive nature of the AMR codec also serves to increase capacity. Because the channel coding can be increased dynamically as needed, additional coding gain is possible meaning that acceptable operation at a lower C/I ratio is possible. Because GSM systems are typically interference-limited (as compared to noise-limited), a lower average C/I ratio effectively means it is possible to put more users on the same system.

Considering only the full-rate AMR codec, the speech quality perceived by the user is improved over the fixed-rate speech codecs (FR, EFR). As an AMR user encounters poor channel conditions, e.g. at the edge of a cell or within a fade, the speech rate is reduced and the channel coding increased. The reduced speech rate leads to a lower but acceptable speech quality. This dynamic change is performed in a controlled manner such that the BER into the speech decoder is always kept at acceptable levels. With a fixed-rate speech codec under similar conditions, the BER into the speech decoder would quickly reach unacceptable levels leading to degraded speech quality out of the decoder.

Figure 1:
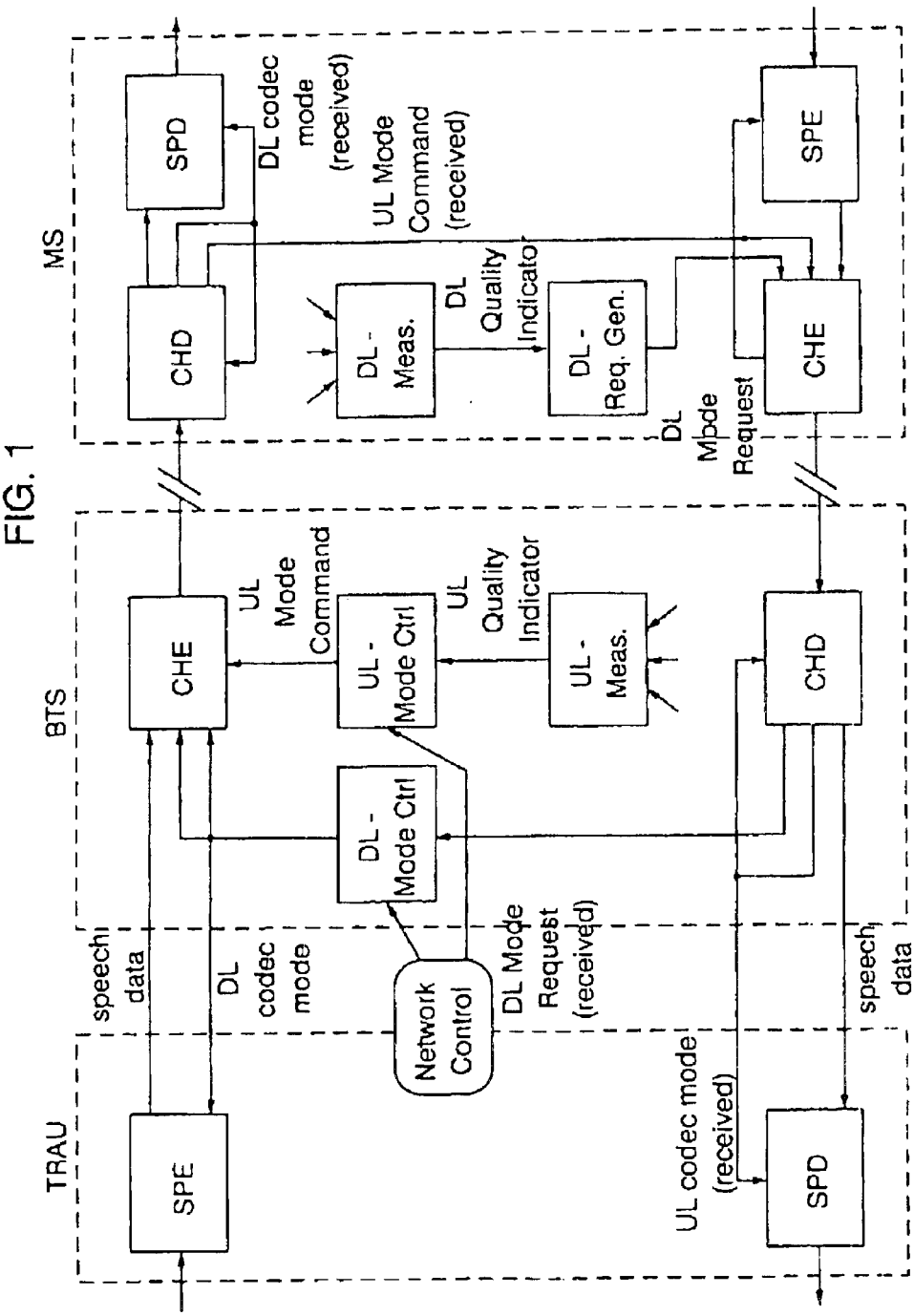
FIG. 1 illustrates a high level block diagram of a basic AMR speech system.

A high-level block diagram of a complete AMR system is illustrated in FIG. 1. The AMR system is comprised of the major components TRAU and base station (BTS) on the network side and the MS or mobile terminal on the portable equipment side.

On the network side, speech encoder (SPE) and channel encoder (CHE) as well as channel decoder (CHD) and speech decoder (SPD) are connected via the serial A-bis interface. For each link, quality information is derived by estimating the current channel state. Based on the channel state, and also taking into consideration possible constraints from network control, the codec mode control, which is located on the network side, selects the codec modes to be applied.

The channel mode to use (TCH/AFS or TCH/AHS) is controlled by the network. Uplink and downlink always apply the same channel mode.

For codec mode adaptation the receiving side performs link quality measurements of the incoming link. The measurements are processed yielding a Quality Indicator. For uplink adaptation, the Quality Indicator is directly fed into the UL mode control unit. This unit compares the Quality Indicator with certain thresholds and generates, also considering possible constraints from network control, a Codec Mode Command indicating the codec mode to be used on the uplink. The Codec Mode Command is then transmitted inband to the mobile side where the incoming speech signal is encoded in the corresponding codec mode. For downlink adaptation, the DL Mode Request Generator within the mobile compares the DL Quality indicator with certain thresholds and generates a Codec Mode Request indicating the preferred codec mode for the downlink. The Codec Mode Request is transmitted inband to the network side where it is fed into the DL Mode Control unit. This unit generally grants the requested mode. However, considering possible constraints from network control, it may also override the request. The resulting codec mode is then applied for encoding of the incoming speech signal in downlink direction. Both for uplink and downlink, the presently applied codec mode is transmitted inband as Codec Mode Indication together with the coded speech data. At the decoder, the Codec Mode Indication is decoded and applied for decoding of the received speech data.

Codec mode selection is done from a set of codec modes (ACS, Active Codec Set), which may include 1 to 4 AMR codec modes. Associated with this set is a list of 0 to 3 switching thresholds and hysteresis used by the DL Mode Request Generator and the UL mode control unit to generate the Codec Mode Requests and Codec Mode Commands. These configuration parameters (ACS, thresholds, hysteresis) are defined at call set-up and can be modified at handover or during a call. In addition, separate configuration parameters may be defined for uplink and downlink channels.

AMR Frame Types and Their Usage

The present invention does not pertain to normal AMR speech frames or the adaptive nature of the codec. Instead, it pertains to the anomalous conditions wherein special AMR frame types are required. These special AMR frame types are described in this section for the AMR full rate channel. The same methods can be extended to the half rate. A full rate GSM speech frame (AMR or otherwise) is comprised of 456 payload bits. For AFS, 8 of these bits are used to distinguish among the up to 4 codec modes within the active codec set. The speech frame (comprised of 95, . . . 244 bits) is channel coded to fill the remaining 448 bits.

Non-audio signaling information (data) may be transmitted on a traffic channel using a FACCH message. Such a message preempts any speech frames scheduled for transmission, i.e. the speech frames are stolen and replaced by the FACCH frames. The FACCH mechanism for AMR is the same as that of the other speech codecs. Specifically, 8 frame steal flags are defined in each received frame which are used to distinguish between FACCH and normal traffic.

The AMR speech codec requires that certain AMR-related parameters be transmitted on the traffic channel in addition to the inband bits located in every speech frame. These parameters must be quickly relayed to the AMR channel codec with precise timing/synchronization (which the FACCH cannot provide). Hence, a new signaling channel termed the RATSCCH has been defined in addition to FACCH. As with FACCH, a RATSCCH frame steals an AMR speech frame in order to transmit its payload. However, the RATSCCH does not use the FACCH frame stealing flags. Instead, the RATSCCH channel is distinguished by a gross 212-bit pattern within the frame. Also allocated within a RATSCCH frame are 32 bits for inband signaling. Sixteen (16) of the bits are allocated to encoding the codec mode indication for the received link while 16 more are allocated to encoding the codec mode request/command for the other link. The RATSCCH message itself is comprised of 35 bits. These are channel encoded to 212 bits to complete the 456 bit frame.

Discontinuous transmission (DTX) is handled quite differently for AMR as compared to the other speech codecs. The beginning of DTX is demarked by a special SID__FIRST half-frame. This half-frame is comprised of a 212 bit identification marker together with a 16-bit encoded codec mode. The transmitter creates this half-frame in order to explicitly signal to the receiver that a DTX period is being entered. The SID__FIRST is placed in the unused bits (even) of the last active speech frame.

During such DTX periods, the speech encoder characterizes the incoming background noise in such a way that corresponding comfort noise may be synthesized at the other end. This comfort noise is encoded into a SID_UPDATE frame which is transmitted periodically with a reduced duty cycle as compared to speech. Such a SID_UPDATE frame is assembled and transmitted in the $3^{rd}$ frame after the SID_FIRST and on every $8^{th}$ frame thereafter. The SID_UPDATE frame is comprised of the following: 212-bit ID marker, 16-bit CMI, 16-bit CMR/CMC, and 212-bit channel encoded comfort noise (originating from 35 source bits). The channel encoding is identical to that of a RATSCCH frame. SID_UPDATE frames are different from the other AMR frames in that they are block interleaved only, i.e. they are not diagonally interleaved.

Once voice becomes active again, the transmitter creates an ONSET half-frame which is used to signal to the receiver to exit DTX mode. The ONSET half-frame is comprised of the 16-bit encoded codec mode repeated multiple times to fill the 228-bit half-frame. It effectively serves in the same capacity as the gross bit pattern ID markers. These bits fill the unused bits (odd) of the first active over-the-air frame.

An AMR receiver must consistently determine the type of received frames. The GSM standard specifies the method for encoding all of the AMR frame types at the transmitter. The GSM standard also specifies minimum performance requirements for an AMR receiver, e.g. BER. The GSM standard does not explicitly specify a method for decoding AMR frame types, however. In this regard, MS and BSS manufacturers are given considerable flexibility provided they meet the minimum requirements, i.e. the ends are specified but not the means. This allows for varying receiver implementations, e.g. homodyne vs. heterodyne RF receivers, DSP vs. ASIC-based equalizers, soft vs. hard bit Viterbi decoding.

Figure 2:
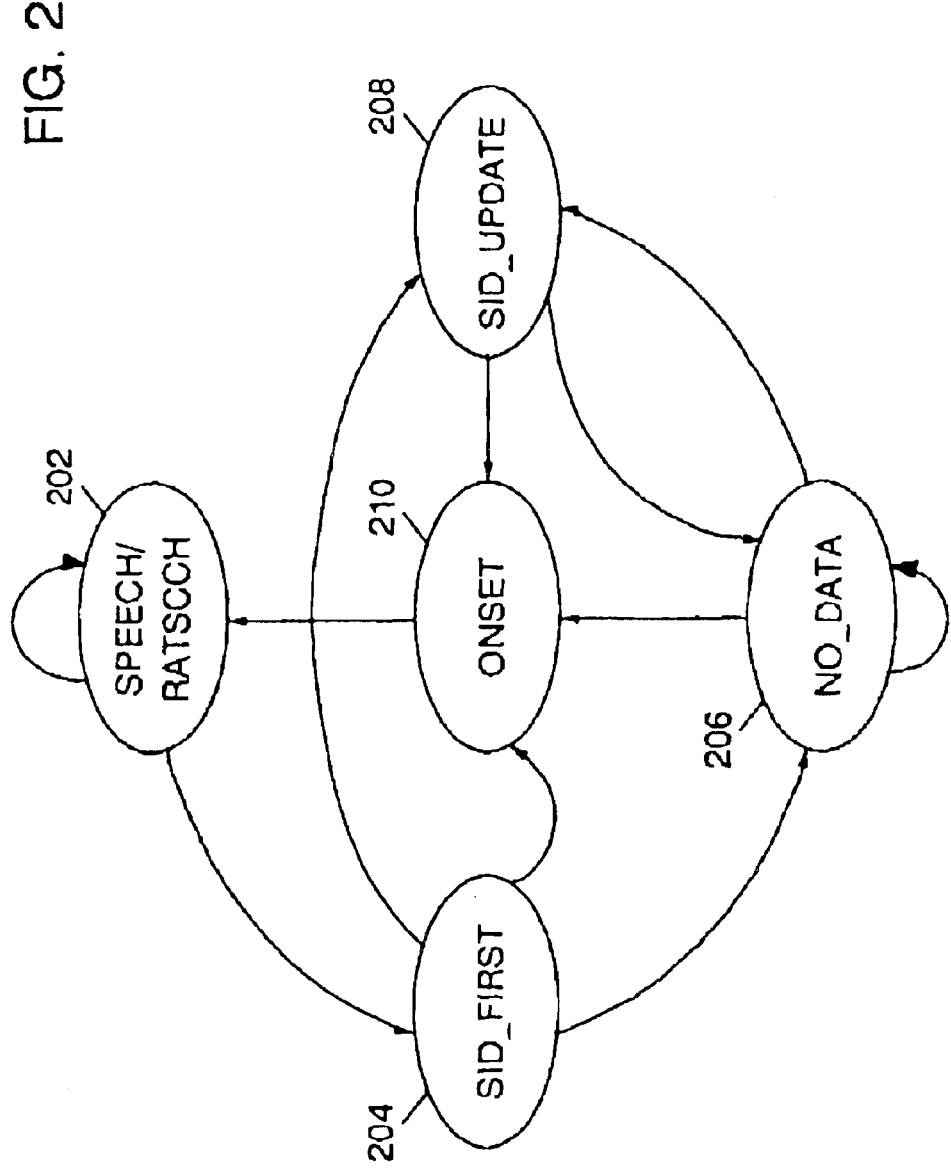
FIG. 2 illustrates a state transition diagram for an AMR speech system.

A method for distinguishing and decoding AMR frames can be reasonably inferred from the encoder specification. In general, only a known subset of frame types is possible in any particular mode. This is shown for AFS in the state diagram of FIG. 2. The subset of AMR frames include speech (SP) 202, SID_FIRST (SF) 204, NO_DATA (ND) 206, SID_UPDATE (SU) 208, and ONSET (ON) 210. When entering DTX mode, the state transition is typically from speech 202 to NO_DATA 206 via determination and identification of a SID_FIRST 204 frame. When exiting DTX mode, the state transition is from NO_DATA 206 or SID_UPDATE 208 back to speech 202 via determination and identification of an ONSET 210 frame.

When voice is active the possible (non-FACCH) frame types are SPEECH, RATSCCH and SID_FIRST. Both RATSCCH and SID_FIRST frames include ID markers within their payload. These markers may be used to determine the frame type. During DTX periods, the only valid frame types are SID_UPDATE (used to transmit comfort noise characteristics) and ONSET (used to denote the end of the DTX period). Frames in which no transmission occurs are denoted as NO_DATA.

The most straightforward method for determining the frame type is to compare against the possible ID markers for each received frame. This comparison is made by extracting those bits from the received frame corresponding to the marker and counting the number of bits that match the candidate ID marker's gross bit pattern. If the number of bit matches is above some threshold, the frame type is determined. The GSM standard sets a threshold for RATSCCH frames that if >=72% of the bits match, the frame shall be classified as RATSCCH whereas if <68% match, the frame shall not be classified as RATSCCH. A slightly more complex method is to use any soft information available, e.g. perform a correlation between the received (soft) bits and the ID markers.

Current AMR Frame Processing Techniques

Figure 3:
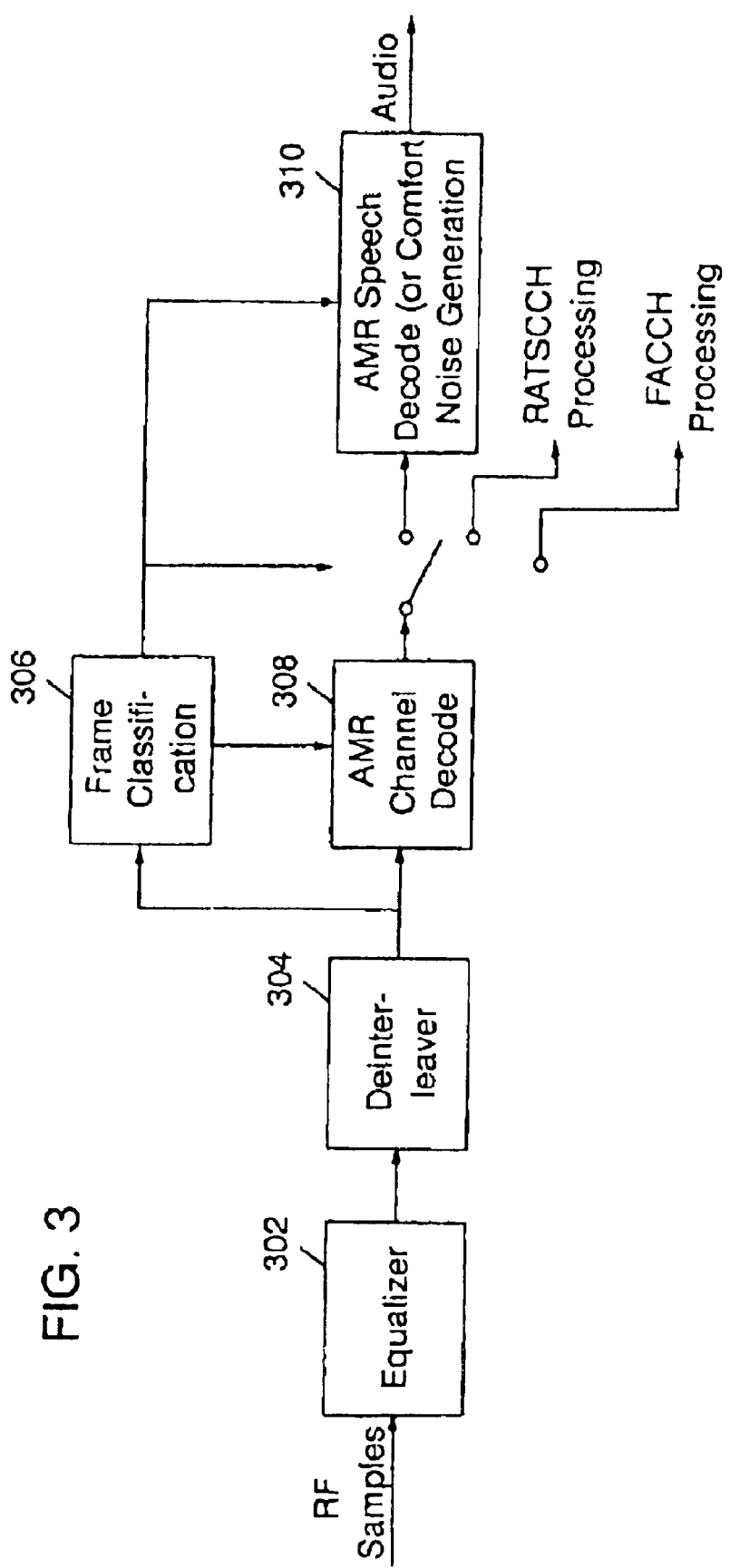
FIG. 3 illustrates a functional block diagram of a typical AMR receiver.

AMR frame processing will be described for both active (non-DTX) and inactive (DTX) modes. Throughout this description, the AMR receiver functional block diagram of FIG. 3 may be used as a reference. Referring to FIG. 3, the AMR receiver receives RF samples into an equalizer 302 and deinterleaves the received frame(s) in deinterleaver 304. The deinterleaved frames are both classified by a frame classification process 306 and decoded by an AMR channel decoder 308. Based on the frame classification, the frames are either speech processed by an AMR speech decoder 310 or processed as control signals, i.e., RATSCCH or FACCH processing.

Deinterleaver 304 may need to deinterleave an incoming frame in multiple ways (to account for SID_UPDATE frames having no diagonal interleaving). Furthermore, the frame classification block 306 could be implemented ahead of the deinterleaver so that the deinterleaver could be explicitly instructed as to which mode of operation to use.

Figure 4:
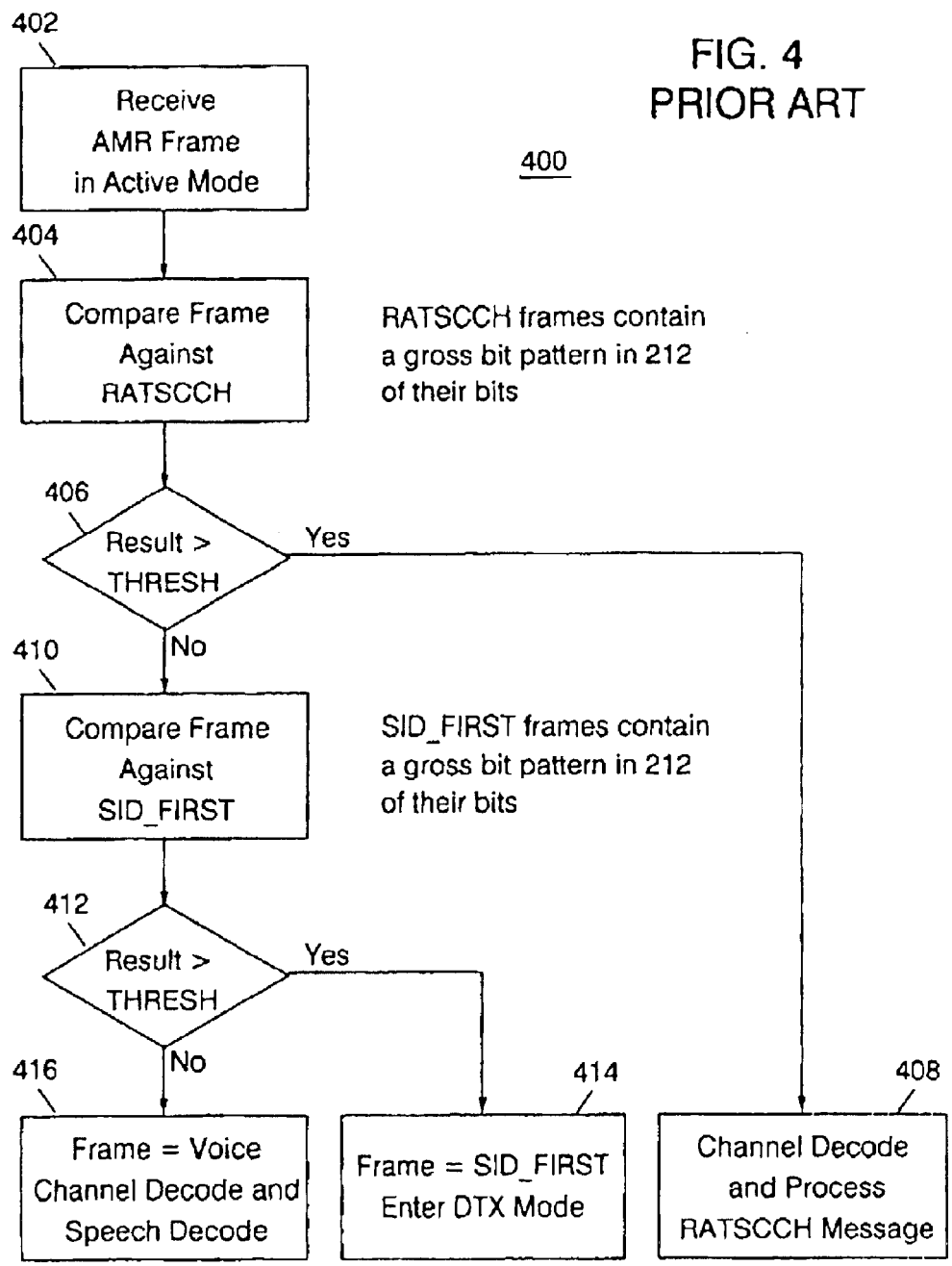
FIG. 4 (prior art) illustrates a flow chart pertaining to the processing of a received frame when not in a DTX mode.

FIG. 4 illustrates a flow chart pertaining to the processing of a received frame 402 when not in a DTX mode. It is presumed that the frame has been demodulated and diagonally block deinterleaved already.

Such a frame is first checked to determine if it contains a RATSCCH message 404. This is accomplished by extracting the 212 bits within the frame corresponding to where the RATSCCH ID marker is allocated and comparing these against the ID marker. If the comparison 406 provides results above some threshold, the frame is classified as RATSCCH and passed to the channel decoder 408. The speech decoder is informed that no data was received and that it must take corrective action such as repeating the last valid received speech frame or muting. This is the same mechanism used for FACCH frame reception in AMR and other speech codecs.

If the frame was determined to not be RATSCCH, it is then checked to see if it was a SID_FIRST frame 410. The SID_FIRST data should be located within the even bits of the frame. As with the RATSCCH case, the 212 bits corresponding to the SID_FIRST marker bits are extracted and compared 412 against the SID_FIRST marker. If the comparison results are above some threshold, the frame is classified as SID_FIRST 414. This classification is provided to the speech decoder and the frame classification state diagram enters the DTX state.

If a received frame is not classified as RATSCCH or SID_FIRST, it is presumed to be a voice frame and is channel decoded 416 appropriately before being passed to the speech decoder. This is by far the most likely case.

Note that in the above description, the RATSCCH vs. SID_FIRST detection could be swapped in order with no significant effect.

FIG. 5 illustrates a flow chart describing the frame classification process for a received AMR frame when in DTX mode.

The received frame 502 is initially checked to see if an ONSET frame was received 504. There are multiple ONSET bit patterns possible. Specifically, there is a distinct bit pattern for each of the modes within the active codec set, i.e. the number of patterns is equal to the size of the ACS. The bit pattern can be treated effectively as a 228-bit ID marker.

The received frame 502 is checked against 506 each of the possible patterns. If any of the comparisons yield results above some threshold, the frame is flagged as an ONSET frame 508. The state of the frame classification algorithm is then changed from DTX to active mode. The next received frame should then be processed using the flowchart of FIG. 4. The half-frame worth of data received with the ONSET is put into the diagonal deinterleaver so that it will be included in the next active frame.

The other possible transmitted frame type during DTX is a SID_UPDATE. These frames have been only block interleaved so for simplicity it is presumed during DTX that received frames have not been diagonally deinterleaved. The frames have the bits corresponding to the 212 bit gross marker extracted and compared 510 against the SID_UPDATE marker. If the comparison results 512 are above some threshold, the frame is classified as a SID_UPDATE 514 and the frame is channel decoded appropriately. The resulting frame is passed to the speech decoder so that it may update its comfort noise frame. The SID_UPDATE detection may also use the a priori knowledge regarding where SID_UPDATE frames should occur.

If a received frame is not determined to be an ONSET or SID_UPDATE, the frame is classified as NO_DATA 516. The speech decoder is informed that no data was received and the frame classification state machine stays in its DTX mode.

FIGS. 6 and 7 illustrate the AMR frame structure of a typical audio signal as it transitions from speech to DTX mode, and the AMR frame structure of a typical audio signal as it transitions from DTX to speech mode, respectively. Referring first to FIG. 6, an analog audio signal 602 is shown against an AMR frame structure 604. The audio signal 602 is comprised of two distinct portions, a speech portion 602a and a comfort noise portion 602b. The speech portion 602a represents active (non-DTX) mode while the comfort noise portion 602b represents inactive (DTX) mode. The actual frames are labeled SP for speech, SF for SID_FIRST, ND for NO_DATA, and SU for SID_UPDATE. In DTX mode, an SU frame occurs every $8^{th}$ frame. Note that the hangover period of silence typically necessary before entering DTX mode has been ignored in this description for simplicity.

Referring to FIG. 7, an analog audio signal 702 is shown against an AMR frame structure 704. The audio signal 702 is comprised of two distinct portions, a speech portion 702a and a comfort noise portion 702b. The speech portion 702a represents active (non-DTX) mode while the comfort noise portion 702b represents inactive (DTX) mode. The actual frames are labeled ND for NO_DATA, SU for SID_UPDATE, ON for ONSET, and SP for speech. Just as in FIG. 6, in DTX mode, an SU frame occurs every $8^{th}$ frame. The detection of an ON frame signals the exiting of DTX mode into speech mode.

Typical Problems Encountered with Current AMR Frame Processing

The typical AMR frame classification and decoding scheme described above will perform adequately in the majority of cases. In particular, it is expected that there will be no problems whenever a receiver is operating consistently above sensitivity. However, one of the goals of the AMR speech codec is to provide decent speech quality under much poorer link conditions than those typically found with the (older) fixed-rate speech codecs. This is indicated by the increased coding gain exhibited by the strongest AMR effective coding rate of 95/448 as compared to the EFR's 244/456.

Under weak signal conditions in general and fading cases in particular, the aforementioned schemes will likely encounter problems regarding DTX operation. This can be illustrated by means of some explicit examples.

Consider the case of a marginal channel that is subject to deep fades. A deep fade may effectively corrupt an entire frame of data (4 bursts for full-rate and 2 for half-rate). If such a fade occurs as a link is entering DTX, the SID_FIRST frame could be lost (corrupted beyond recognition). The result would be that the AMR receiver would continue processing under the presumption that the channel was still active. Received frames would continue to be processed as if they were speech even though they actually contain just random noise. On occasion, this noise might pass the cyclic redundancy check (CRC) check and be sent through to the speech decoder. The result would be an audible pop, click, or similar artifact. This would likely get extended to multiple speech frames as subsequent frames are correctly classified as bad leading to a repetition of the last "good" frame (which was actually random data). Regardless of this somewhat drastic effect, the audio at the receiver will not match the background noise at the transmitter very well as is optimal with a properly functioning DTX state. This is because the SID_UPDATE frames used to generate comfort noise at the receiver are not being received.

A similar problem can occur when leaving a DTX period. Suppose an ONSET frame is missed by a receiver due to poor channel conditions. The receiver remains in its DTX state searching for SID_UPDATE or ONSET frames. Finding none, it continues playing comfort noise rather than properly passing through the active speech frames (or RATSSCH or FACCH) from the transmitter. This state of playing comfort noise will last until the call is dropped or the link re-enters and then exits DTX without the ONSET being lost. The receiving user would probably be annoyed and confused as the audio stayed muted for this extended time and entire pieces of the conversation are lost.

Solutions to Frame Classification Deficiencies

The present invention presents multiple alternatives that solve the aforementioned problems. It is to be recognized by those skilled in the art that various combinations of the alternatives may also be used along with derivatives that are not explicitly discussed. The present invention can be implemented in software (DSP or general-purpose microprocessor), hardware, or a combination of hardware and software.

The description is divided into DTX and non-DTX mode processing. A state flag is maintained to determine if the receiver is in DTX mode or not. For each received frame, this flag determines which processing is to be followed.

Active Mode (non-DTX) Frame Processing

Active mode (non-DTX) processing 800 is described in the flowchart of FIG. 8. As in FIG. 4, the received frame 802 is first tested to see if it is a RATSCCH or SID_FIRST frame. If either of these is detected 804, 806, 808, 810, the frame is processed appropriately 812, 814. Unlike in FIG. 4, if neither of these special AMR frames is detected, it is not automatically presumed that the frame is a voice frame.

If the frame is neither a RATSCCH nor SID_FIRST frame, it is next tested 816 to determine if it is a SID_UPDATE frame. Since this is unlikely in non-DTX mode and it is desirable to not misclassify a speech frame as a SID_UPDATE, a high threshold is generally used in the detection algorithm, e.g. correlation. It is suggested that at least 95% of the ID marker bits match the SID_UPDATE marker before the SID_UPDATE classification is made. This threshold is better kept as a variable rather than a constant. Based on the results of the SID_UPDATE marker comparison 818, the AMR frame is either deemed a voice frame 820 or a SID_UPDATE frame 822 and processed accordingly.

If a number of bad speech frames (as indicated by a failing CRC) are received continuously, it is likely that the link has entered a DTX state. Therefore, the high threshold mentioned previously is reduced once a bad frame counter reaches some threshold. More generally, the threshold is calculated after each frame is processed based on the value of the bad frame counter. In the limit, a large bad frame counter would map to a reduced threshold approximately the same as that used normally for valid frames, e.g. a hard or soft correlation metric equating to ~70% bits matching the SID_UPDATE ID marker.

Figure 9:
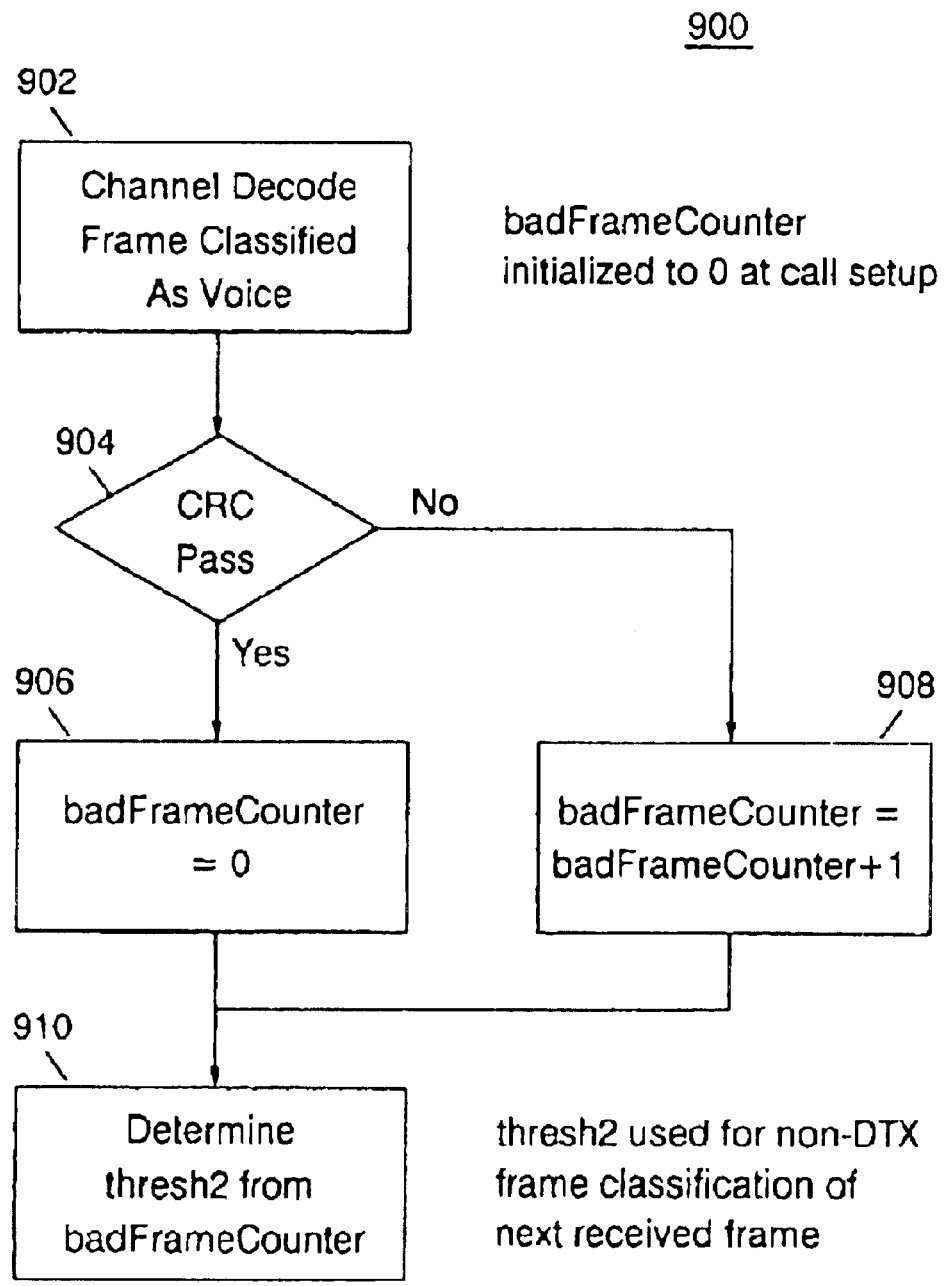
FIG. 9 illustrates a flow chart describing the determination of a SID_UPDATE threshold for active mode frame classification.

The determination process 900 of this threshold is described in FIG. 9. A bad frame counter is initialized to zero (0) at call setup. A channel decoded frame classified as voice 902 is subjected to a CRC check 904. If it passes the CRC check the bad frame counter remains or is reset to zero 906. If it fails the CRC check the bad frame counter is incremented by one 908. A new threshold is determined from the current bad frame counter 910. The new threshold is then used for non-DTX frame classification for the next received frame.

Usage of the CRC check for bad frame counting (and associated threshold setting) represents the simplest method of bad frame determination. In practice, the weakness of the 6-bit CRC means this method is not adequate for all conditions. Hence, a secondary check is often needed to test for bad frames. One such method is to implement a BER estimation based on re-encoding the channel decoded data and comparing the re-encoded data against the received (coded) data. If the CRC fails or the estimated channel BER is above some threshold, the frame is classified as bad. A similar alternative involves using a metric calculated as part of the Viterbi channel decoding. If the CRC fails or the metric indicates that there is little confidence that the channel decoding was correct, the frame is classified as bad.

DTX Mode Frame Processing

Figure 10:
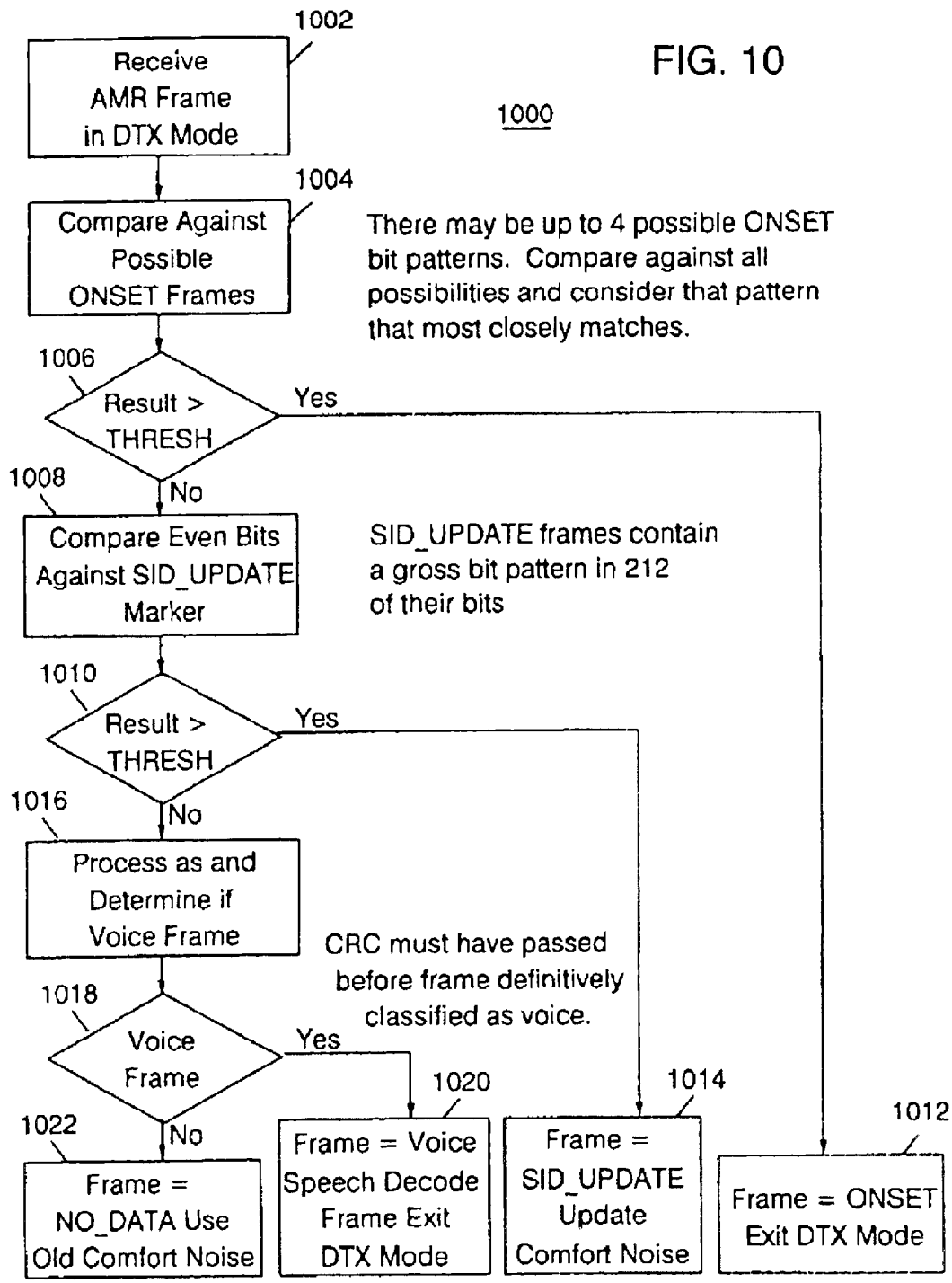
FIG. 10 illustrates a flow chart describing DTX frame classification processing according to an embodiment of the present invention.

DTX mode processing 1000 is described in the flowchart FIG. 10. The first few steps are similar to that described previously and illustrated in FIG. 5. Specifically, the received frame 1002 is first checked to see if it is an ONSET frame 1004, 1006 or a SID_UPDATE frame 1008, 1010. If either of these is detected, the frame is processed appropriately 1012, 1014.

The processing difference occurs if neither an ONSET nor SID_UPDATE is detected. Rather than presuming the frame contains no data as in FIG. 5, the possibility that the frame is an active frame is considered. This considers the case where an ONSET frame was missed by the receiver when the link exited DTX mode. This involves attempting to decode the frame as speech before definitively classifying the AMR frame type 1016. If a voice frame is detected 1018, it is processed as such 1020. Otherwise, the frame is classified as NO_DATA 1022 and processed identically to the process described in FIG. 5.

In general an active frame could be RATSCCH, FACCH or voice. In practice, RATSCCH and FACCH frames are received so infrequently that they may be ignored for purposes of exiting DTX via these methods without significant performance degradation. Because RATSCCH and FACCH frames require acknowledgements, they will be retransmitted if lost so that their loss is not fatal to call operation. Hence, some of the alternative methods presented below ignore the FACCH/RATSCCH frame possibility.

There are multiple, but related, methods for determining if the received frame might contain speech. These are described next beginning with a simpler method and appending more complex checks to it. These methods are represented by step 1016 in FIG. 10.

Voice CRC Check

An unclassified frame is always processed as if it is speech and the CRC is checked. First, the inband bits indicating the codec mode are decoded. The codec mode indication from the current frame or a previous one is used to determine the potential codec rate. The frame is then channel decoded as a speech frame using that codec mode. If the CRC passes, the frame is passed on to the speech decoder and DTX mode is exited. Otherwise, the frame is classified as NO_DATA and comfort noise continues to be played.

This simple method has the disadvantage that random data will occasionally cause a CRC to pass. Considering that the CRC is 6 bits, a passing CRC from random data would occur in approximately 1 out of 64 frames, i.e. DTX mode would be mistakenly exited with a mean time of slightly over a second. Hence, an additional check is advisable.

One method for reducing the probability of mistakenly exiting DTX due to a CRC pass on random DTX data is to require voice CRC passes on M consecutive received frames before exiting DTX. An M of 2 is sufficient but a higher value such as 3 or 4 can be implemented without a significant effect to the call. This method 1100 is described in FIG. 11. A channel decoded voice frame 1102 is subjected to a CRC test 1104. If the CRC test passes a good frame count (initially set to zero) is incremented 1106. The good frame count is then checked against a threshold level M 1108. If the good frame count meets or exceeds the threshold then the AMR frame is classified as voice 1110 and processed accordingly. If the good frame count does not meet or exceed the threshold then the AMR frame is classified as NO_DATA 1112 and processed accordingly. If the initial CRC test fails then the good frame count is set to zero 1114 and the frame is subsequently classified as NO_DATA 1112.

Usage of SID UPDATE Duty Cycle

Figure 12:
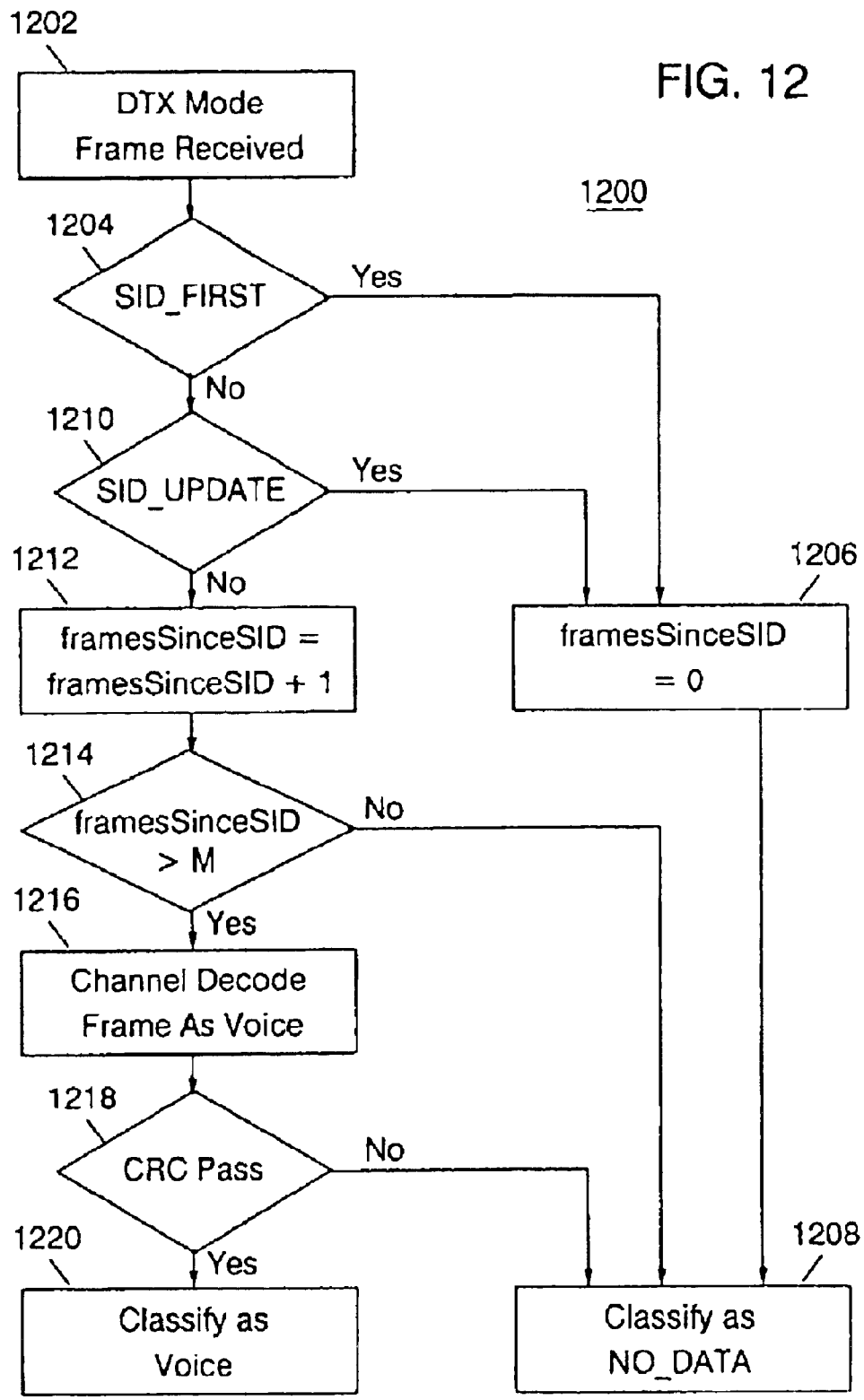
FIG. 12 illustrates a flow chart describing DTX frame classification processing using the SID_UPDATE duty cycle.

Another method for reducing the probability of mistakenly exiting DTX mode is to use the duty cycle of SID_UPDATE transmissions to advantage. Within a DTX period, a SID_UPDATE frame should nominally be received every 8 frames. The SID_UPDATE frames are heavily encoded so it is unlikely that they will often be missed or that their CRC check will fail. If the receiver fails to correctly detect and decode a SID_UPDATE within some time period greater than the SID_UPDATE period, it is likely that the link exited DTX and the ONSET frame was missed. Hence, an attempt is made to channel decode subsequent frames as SPEECH until a SID_UPDATE frame is found. If a frame is channel decoded and its CRC passes, the frame is passed on to the speech decoder and DTX mode is exited. This process 1200 is shown in FIG. 12.

When a DTX mode frame is received 1202 it is first checked to determine whether it is a SID_FIRST frame 1204. If it is, the counter variable "framesSinceSID" is set to zero 1206 and the frame is considered as NO_DATA

1208 for purposes of speech processing. If the frame is not a SID_FIRST frame it is checked to determine if it is a SID_UPDATE frame 1210. If it is, the counter variable "framesSinceSID" is set to zero 1206 and the frame is classified as NO_DATA 1208. If it is not a SID_UPDATE frame the counter variable "framesSinceSID" is incremented by one 1212. Next, the counter variable "framesSinceSID" is checked 1214 to determine if it is greater than a threshold, M. M is typically set to 8 which is the number of frames expected between SID_UPDATE frames. If the counter variable "framesSinceSID" is not greater than M, then the frame is classified as NO_DATA 1208. If the counter variable "framesSinceSID" is greater than M, then the frame is channel decoded as a voice frame 1216. Next, the channel decoded voice frame is subjected to a CRC test 1218. If the CRC test fails the frame is classified as NO_DATA 1208. If the CRC test passes the frame is classified as voice 1220 and DTX mode is exited.

Figure 11:
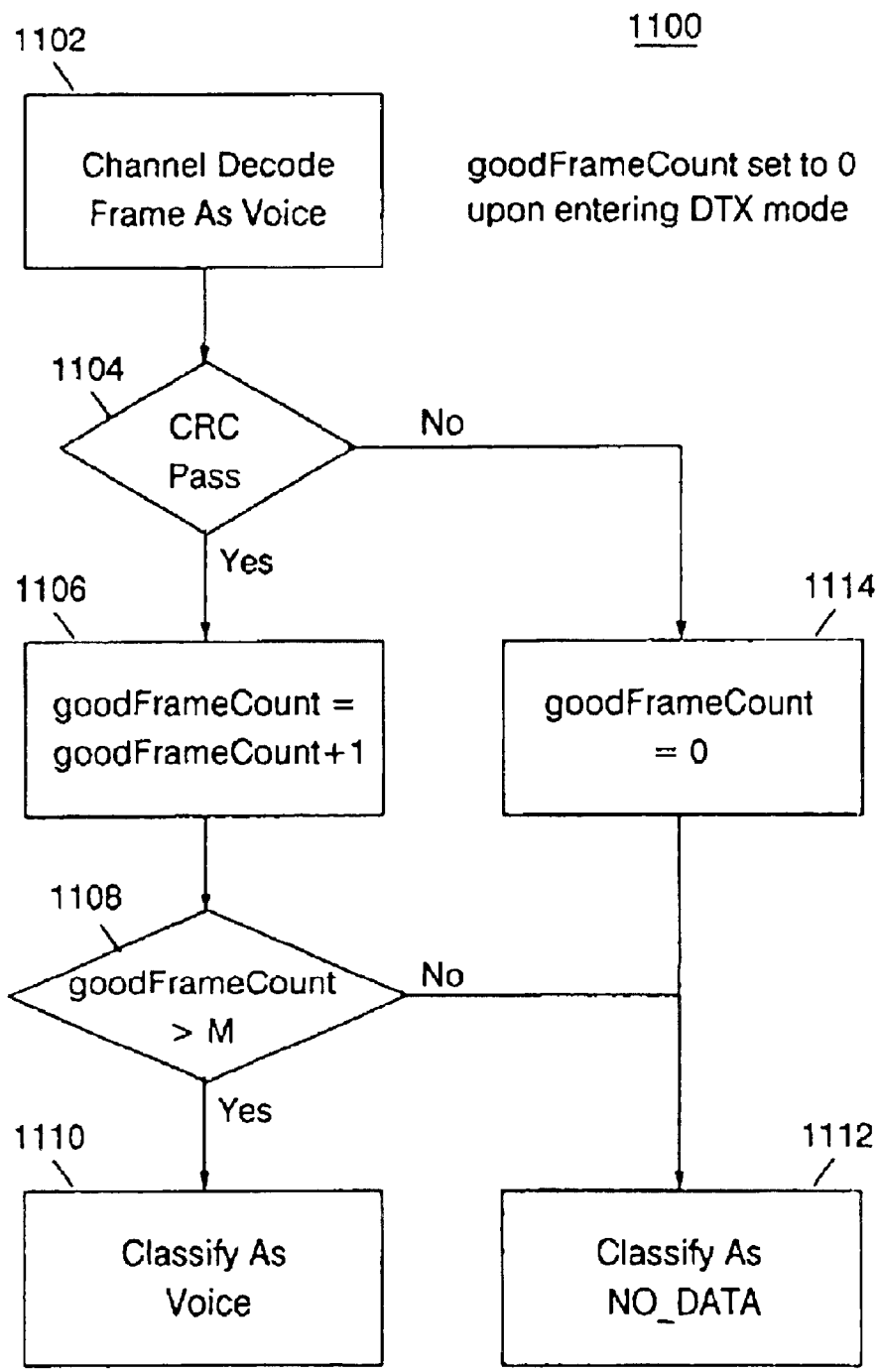
FIG. 11 illustrates a flow chart describing DTX frame classification processing using a CRC process.

As compared with the method in FIG. 11, this method has the advantage of avoiding the largely unnecessary processing incurred by channel decoding all DTX-mode NO_DATA frames as speech.

Viterbi Convolutional Decode Metric

The usage of the SID_UPDATE duty cycle has the disadvantage of delaying the enabling of speech beyond what is necessary (by typically 160–500 ms). To avoid this delay or to avoid the good frame counter variable from being subjected to multiple CRC tests, another metric may be used to gate the enabling of voice during DTX mode.

Figure 13:
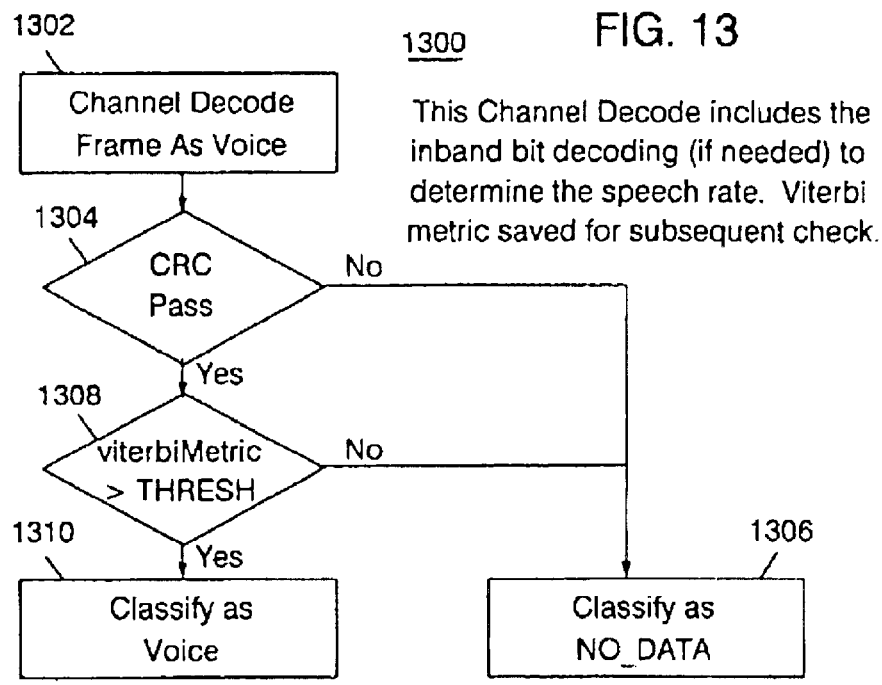
FIG. 13 illustrates a flow chart describing DTX frame classification processing using a Viterbi metric.

A metric from the convolutional (e.g. Viterbi) decode portion of the channel decoder can be used to indicate channel quality. Such an indicator is usually available as a by product of the Viterbi decode as it is often used during non-DTX mode to provide a dangerous frame indicator (DFI) to the speech decoder when the CRC has passed but the frame is questionable. If the Viterbi metric indicates that the channel quality is above some threshold and the CRC passes, the frame will be passed to the speech decoder and DTX mode exited. This process 1300 is shown in the flowchart of FIG. 13.

A channel decoded frame classified as voice 1302 is subjected to a CRC test 1304. If it fails the CRC test, it is classified as NO_DATA 1306. If it passes the CRC test, it is subjected to a Viterbi metric threshold test 1308. If it fails the Viterbi metric threshold test, it is classified as NO_DATA 1306. If it passes the Viterbi metric threshold test, it is classified as a voice frame 1310 and DTX mode is exited.

C/I Channel Quality Measure or Inband Bit Decode

Yet another metric is readily available in most AMR speech codec implementations. As part of the link adaptation, an AMR receiver constantly monitors the channel quality. This is typically accomplished by measuring the Carrier-to-Interferer (C/I) ratio. Hence, an alternative to using the Viterbi metric described previously would be to use the calculated C/I ratio corresponding to those bursts representing the received frame (or, equivalently, any other channel quality measure being used).

Yet another method uses a metric calculated within the inband bit decode. This decode is typically implemented by correlating the bits corresponding to the inband bits against the known patterns. If the correlation is above some threshold, this could be used as an indication of acceptable channel quality and a full channel decode could be attempted. This correlation is computationally simple compared to some of the previous techniques.

Figure 14:
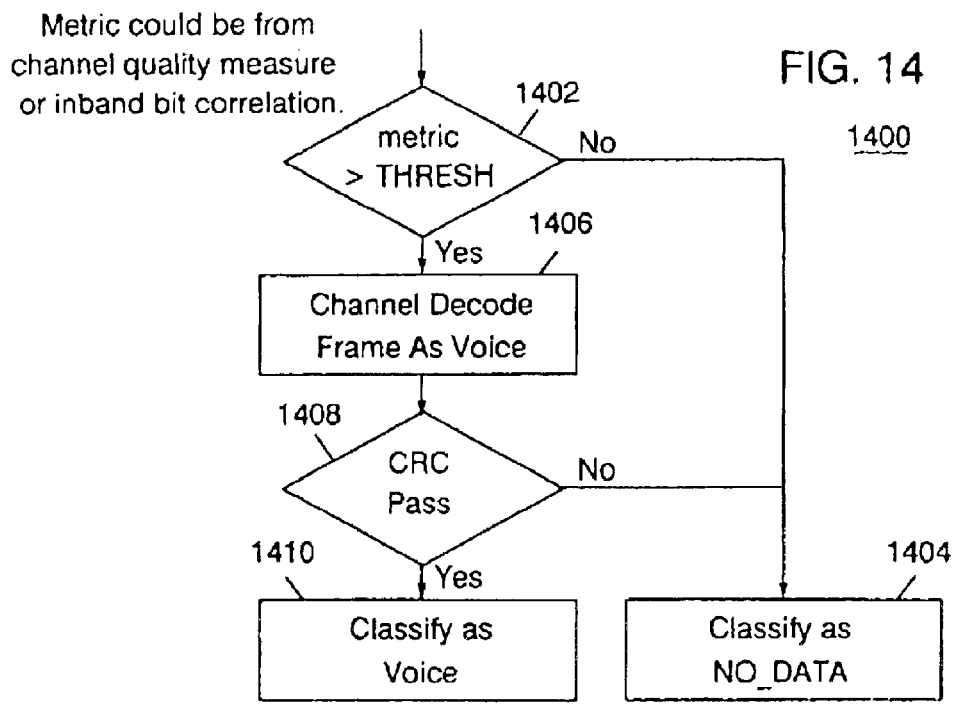
FIG. 14 illustrates a flow chart describing DTX frame classification processing using alternative metrics.

The use of either the channel quality measure or the inband bit correlation is described in the diagram of FIG. 14. A metric value is compared against a defined threshold 1402. The metric for this implementation could be either a channel quality measure or an inband bit correlation. If the threshold is not met, then the frame is classified as NO_DATA 1404. If the threshold is met, then the frame is channel decoded as a voice frame 1406. It is then subjected to a CRC test 1408. If the CRC test fails, the frame is classified as NO_DATA 1404. If the CRC test passes, the frame is classified as voice 1410 and DTX mode is exited.

These methods have an advantage with respect to the Viterbi metric method in that the full channel decode may be avoided for most DTX-mode frames.

Combinations

Combinations of the above methods for detecting voice frames during DTX mode are possible. For example, in the methods that involve thresholds, the thresholds can be manipulated based on the number of frames since the last valid SID frame type.

The preferred embodiment is that of using the SID_UPDATE duty cycle to advantage. Though this method introduces a slight delay in the onset of speech, this is believed to be insignificant due to the infrequency in which this procedure would be used to exit DTX mode, i.e. in the large majority of cases DTX will be exited using ONSET. Furthermore, this method is simple computationally and does not involve significant unnecessary processing. However, the preferred embodiment is quite implementation-specific meaning the alternative embodiments may be optimal for some architectures.

The present disclosure has been described in terms of AFS (full rate AMR) in order to illustrate the concepts of the present invention. The present invention also applies to AHS (half rate AMR) as well. AHS is very similar to AFS in that it uses a comfort noise frame and an ONSET frame. Rather than a single SID_FIRST, AHS defines a SID_FIRST_P1 and a SID_FIRST_P2. The SID_FIRST_P1 can be used in the same capacity of the AFS SID_FIRST for purposes of this invention. There are several additional "inhibit" frame types for handling anomalous AHS cases. These frames can be used in the same capacity as ONSET frames for purposes of the present invention. The primary difference between AFS and AHS frame types is that the "ID markers" are different for AHS frame types and AFS frame types. They may be located in different bit positions, e.g. marker bits located in AFS frame "even" bits may be located in the first portion of the bits for an AHS frame. The present invention as described above in terms of AFS is easily extrapolated to AHS by those of ordinary skill in the art.

Moreover, the disclosure is written in the context of AMR only for concreteness, clarity, and ease of description. However, the present invention is generically applicable to other speech services that utilize a demarker for the beginning of DTX, a demarker for the end of DTX, and some frame type for transferring comfort noise.

Specific embodiments of the present invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for" are not intended to be read as means-plus-function elements, even if the claim otherwise includes the word "means".

What is claimed is:

1. A method of determining whether a receiver in a DTX-capable digital speech communications system having unique frames for demarking the beginning of DTX mode, demarking the end of DTX mode, and containing comfort noise frames should remain in active (non-DTX) mode or switch to inactive (DTX) mode, the method comprising:

receiving a frame in active (non-DTX) mode;

determining if the received frame includes a marker signifying the beginning of DTX and processing accordingly by switching to inactive (DTX) mode; otherwise, determining if the received frame is a comfort noise frame and processing accordingly by switching to inactive (DTX) mode; otherwise, processing the received frame as a voice frame in active (non-DTX) mode.

2. A method of determining whether a receiver in a DTX-capable digital speech communications system having unique frames for demarking the beginning of DTX mode, demarking the end of DTX mode, and containing comfort noise frames should remain in inactive (DTX) mode or switch to active (non-DTX) mode, the method comprising:

receiving a frame in inactive (DTX) mode;

determining if the received frame is a comfort noise frame and processing accordingly; otherwise, determining if the received frame includes a marker signifying the end of DTX and switching to active (non-DTX) mode; otherwise, determining if the received frame is a voice frame, and if so, switching to active (non-DTX) mode, otherwise classifying the received frame as a NO_DATA frame and remaining in inactive (DTX) mode.

3. A system for determining whether a receiver in a DTX-capable digital speech communications system having unique frames for demarking the beginning of DTX mode, demarking the end of DTX mode, and containing comfort noise frames should remain in active (non-DTX) mode or switch to inactive (DTX) mode, the system comprising:

means for receiving a frame in active (non-DTX) mode;

means for determining if the received frame includes a marker signifying the beginning of DTX and processing accordingly by switching to inactive (DTX) mode; otherwise, means for determining if the received frame is a comfort noise frame and processing accordingly by switching to inactive (DTX) mode; otherwise, means for processing the received frame as a voice frame in active (non-DTX) mode.

4. A system for determining whether a receiver in a DTX-capable digital speech communications system having unique frames for demarking the beginning of DTX mode, demarking the end of DTX mode, and containing comfort noise frames should remain in inactive (DTX) mode or switch to active (non-DTX) mode, the system comprising:

means for receiving a frame in inactive (DTX) mode;

means for determining if the received frame is a comfort noise frame and processing accordingly; otherwise, means for determining if the received frame includes a marker signifying the end of DTX and switching to active (non-DTX) mode; otherwise, means for determining if the received frame is a voice frame, and if so, switching to active (non-DTX) mode, otherwise classifying the received frame as a NO_DATA frame and remaining in inactive (DTX) mode.

5. A method of determining whether an AMR enabled receiver in active (non-DTX) mode should remain in active (non-DTX) mode or switch to inactive (DTX) mode, the method comprising:

performing a SID_FIRST marker comparison on the received AMR frame comprising:

comparing bits in the SID_FIRST marker fields of the received AMR frame against a SID_FIRST marker;

determining whether the results of the SID_FIRST marker comparison exceed a SID_FIRST threshold, and if so, processing the received AMR frame as a SID_FIRST frame and entering inactive (DTX) mode; otherwise, performing a SID_UPDATE marker comparison on the received AMR frame comprising:

comparing bits in the SID_UPDATE marker field of the received AMR frame against a SID_UPDATE marker;

determining whether the results of the SID_UPDATE marker comparison exceed a SID_UPDATE threshold, and if so, processing the received AMR frame as a SID_UPDATE frame and entering inactive (DTX) mode; otherwise, processing the received AMR frame as a voice frame in active (non-DTX) mode.

6. The method of claim 5 further comprising determining if a RATSCCH frame was received, said RATSCCH frame determination comprising:

comparing bits corresponding to the RATSCCH marker of the received AMR frame against a RATSCCH marker;

determining whether the results of the RATSCCH marker comparison exceed a RATSCCH threshold, and if so, processing the received AMR frame as a RATSCCH frame.

7. The method of claim 5 wherein bit comparisons use received soft bits.

8. The method of claim 5 wherein determining the SID_UPDATE threshold comprises:

channel decoding the received AMR frame as a voice frame;

performing a bad speech frame test on the channel decoded AMR frame wherein if the bad frame test passes, then a badFrameCounter variable is set to zero, otherwise the badFrameCounter is incremented by one; and setting the SID_UPDATE threshold based upon the badFrameCounter.

9. The method of claim 8 wherein determining a bad frame comprises:

checking the CRC and classifying the frame as bad if the CRC failed, otherwise checking a Viterbi metric output from a Viterbi channel decoder and classifying the frame as bad if the metric is below some threshold.

10. The method of claim 8 wherein determining a bad frame comprises:

checking the CRC and classifying the frame as bad if the CRC failed, otherwise estimating the channel BER and classifying the frame as bad if the estimated bit errors for the received frame are above some threshold.

11. A method of determining whether an AMR enabled receiver in inactive (DTX) mode should remain in inactive (DTX) mode or switch to active (non-DTX) mode, the method comprising:

receiving an AMR frame in inactive (DTX) mode;

performing an ONSET frame comparison on the received AMR frame comprising:

comparing the received AMR frame against a set of possible ONSET frames;

determining whether the results of ONSET frame comparison exceed a threshold, and if so, processing the received AMR frame as an ONSET frame and switching to active (non-DTX) mode; otherwise, performing a SID_UPDATE marker comparison on the received AMR frame comprising:

comparing those bits in the SID_UPDATE marker field of the received AMR frame against a SID_UPDATE marker;

determining whether the results of the SID_UPDATE marker comparison exceed a threshold, and if so, processing the received AMR frame as a SID_UPDATE frame and remaining in inactive (DTX) mode; otherwise, determining whether the received AMR frame is a voice frame, and if so, switching to active (non-DTX) mode, otherwise classifying the received AMR frame as a NO_DATA frame and remaining in inactive (DTX) mode.

12. The method of claim 11 wherein the step of determining whether the received AMR frame is a voice frame is comprised of:

channel decoding the received AMR frame as a voice frame;

performing a bad frame test on the channel decoded AMR frame and if the bad frame test fails, then the received AMR frame is classified as a NO_DATA frame; otherwise, if the bad frame test passes, then incrementing a goodFrameCount variable by one;

comparing the goodFrameCount variable against a threshold value and if the goodFrameCount variable exceeds the threshold value, then the received AMR frame is classified as a voice frame, otherwise the received AMR frame is classified as a NO_DATA frame.

13. The method of claim 11 wherein the step of determining whether the received AMR frame is a voice frame is comprised of:

determining if the received AMR frame is a SID_FIRST frame, and if so, setting a framesSinceSID variable to zero; otherwise, determining if the received AMR frame is a SID_UPDATE frame, and if so, setting a framesSinceSID variable to zero; otherwise, incrementing the framesSinceSID variable by one;

determining whether the framesSinceSID variable exceeds a threshold, and if not, classifying the received AMR frame as NO_DATA; otherwise, channel decoding the received AMR frame as a voice frame;

performing a bad frame test on the channel decoded AMR frame, and if it passes, the received AMR frame is classified as a voice frame, otherwise the received AMR frame is classified as a NO_DATA frame.

14. The method of claim 11 wherein the step of determining whether the received AMR frame is a voice frame is comprised of:

channel decoding the received AMR frame as a voice frame;

performing a CRC test on the channel decoded AMR frame, and if it fails, the received AMR frame is classified as a NO_DATA frame; otherwise, performing a Viterbi metric threshold test on the channel decoded AMR frame, and if it exceeds the Viterbi metric threshold, the received AMR frame is classified as a voice frame, otherwise the received AMR frame is classified as a NO_DATA frame.

15. The method of claim 11 wherein the step of determining whether the received AMR frame is a voice frame is comprised of:

performing a carrier-to-interference (C/I) metric threshold test on the received AMR frame, and if it fails the C/I metric threshold test, the received AMR frame is classified as a NO_DATA frame; otherwise, channel decoding the received AMR frame as a voice frame;

performing a CRC test on the channel decoded AMR frame, and if it passes, the received AMR frame is classified as a voice frame, otherwise the received AMR frame is classified as a NO_DATA frame.

16. The method of claim 11 wherein the step of determining whether the received AMR frame is a voice frame is comprised of:

performing an inband bit correlation metric threshold test on the received AMR frame, and if it fails the inband bit correlation metric threshold test, the received AMR frame is classified as a NO_DATA frame; otherwise, channel decoding the received AMR frame as a voice frame;

performing a CRC test on the channel decoded AMR frame, and if it passes, the received AMR frame is classified as a voice frame, otherwise the received AMR frame is classified as a NO_DATA frame.

17. A system for determining whether an AMR enabled receiver in active (non-DTX) mode should remain in active (non-DTX) mode or switch to inactive (DTX) mode, the system comprising:

means for performing a SID_FIRST marker comparison on the received AMR frame comprising:

means for comparing bits in the SID_FIRST marker fields of the received AMR frame against a SID_FIRST marker;

means for determining whether the results of the SID_FIRST marker comparison exceed a SID_FIRST threshold, and if so, processing the received AMR frame as a SID_FIRST frame and entering inactive (DTX) mode; otherwise, means for performing a SID_UPDATE marker comparison on the received AMR frame comprising:

means for comparing bits in the SID_UPDATE marker field of the received AMR frame against a SID_UPDATE marker;

means for determining whether the results of the SID_UPDATE marker comparison exceed a SID_UPDATE threshold, and if so, processing the received AMR frame as a SID_UPDATE frame and entering inactive (DTX) mode; otherwise, means for processing the received AMR frame as a voice frame in active (non-DTX) mode.

18. The system of claim 17 further comprising determining if a RATSCCH frame was received, said RATSCCH frame determination comprising:

means for comparing bits corresponding to the RATSCCH marker of the received AMR frame against a RATSCCH marker;

means for determining whether the results of the RATSCCH marker comparison exceed a RATSCCH threshold, and if so, processing the received AMR frame as a RATSCCH frame.

19. The system of claim 17 wherein bit comparisons use received soft bits.

20. The system of claim 17 wherein determining the SID_UPDATE threshold comprises:
  means for channel decoding the received AMR frame as a voice frame;
  means for performing a bad speech frame test on the channel decoded AMR frame wherein if the bad frame test passes, then a badFrameCounter variable is set to zero, otherwise the badFrameCounter is incremented by one; and
  means for setting the SID_UPDATE threshold based upon the badFrameCounter.

21. The system of claim 20 wherein determining a bad frame comprises:
  means for checking the CRC and classifying the frame as bad if the CRC failed, otherwise
  means for checking a Viterbi metric output from a Viterbi channel decoder and classifying the frame as bad if the metric is below some threshold.

22. The system of claim 20 wherein determining a bad frame comprises:
  means for checking the CRC and classifying the frame as bad if the CRC failed, otherwise
  means for estimating the channel BER and classifying the frame as bad if the estimated bit errors for the received frame are above some threshold.

23. A system for determining whether an AMR enabled receiver in inactive (DTX) mode should remain in inactive (DTX) mode or switch to active (non-DTX) mode, the system comprising:
  means for receiving an AMR frame in inactive (DTX) mode;
  means for performing an ONSET frame comparison on the received AMR frame comprising:
    means for comparing the received AMR frame against a set of possible ONSET frames;
    means for determining whether the results of ONSET frame comparison exceed a threshold, and if so, processing the received AMR frame as an ONSET frame and switching to active (non-DTX) mode; otherwise,
  means for performing a SID_UPDATE marker comparison on the received AMR frame comprising:
    means for comparing those bits in the SID_UPDATE marker field of the received AMR frame against a SID_UPDATE marker;
    means for determining whether the results of the SID_UPDATE marker comparison exceed a threshold, and if so, processing the received AMR frame as a SID_UPDATE frame and remaining in inactive (DTX) mode; otherwise,
  means for determining whether the received AMR frame is a voice frame, and if so, switching to active (non-DTX) mode, otherwise classifying the received AMR frame as a NO_DATA frame and remaining in inactive (DTX) mode.

24. The system of claim 23 wherein the step of determining whether the received AMR frame is a voice frame is comprised of:
  means for channel decoding the received AMR frame as a voice frame;
  means for performing a bad frame test on the channel decoded AMR frame and if the bad frame test fails, then the received AMR frame is classified as a NO_DATA frame; otherwise, if the bad frame test passes, then
  means for incrementing a goodFrameCount variable by one;
  means for comparing the goodFrameCount variable against a threshold value and if the goodFrameCount variable exceeds the threshold value, then the received AMR frame is classified as a voice frame, otherwise the received AMR frame is classified as a NO_DATA frame.

25. The method of claim 23 wherein the step of determining whether the received AMR frame is a voice frame is comprised of:
  means for determining if the received AMR frame is a SID_FIRST frame, and if so, setting a framesSinceSID variable to zero; otherwise,
  means for determining if the received AMR frame is a SID_UPDATE frame, and if so, setting a framesSinceSID variable to zero; otherwise,
  means for incrementing the framesSinceSID variable by one;
  means for determining whether the framesSinceSID variable exceeds a threshold, and if not, classifying the received AMR frame as NO_DATA; otherwise,
  means for channel decoding the received AMR frame as a voice frame;
  means for performing a bad frame test on the channel decoded AMR frame, and if it passes, the received AMR frame is classified as a voice frame, otherwise the received AMR frame is classified as a NO_DATA frame.

26. The system of claim 23 wherein the step of determining whether the received AMR frame is a voice frame is comprised of:
  means for channel decoding the received AMR frame as a voice frame;
  means for performing a CRC test on the channel decoded AMR frame, and if it fails, the received AMR frame is classified as a NO_DATA frame; otherwise,
  means for performing a Viterbi metric threshold test on the channel decoded AMR frame, and if it exceeds the Viterbi metric threshold, the received AMR frame is classified as a voice frame, otherwise the received AMR frame is classified as a NO_DATA frame.

27. The system of claim 23 wherein the step of determining whether the received AMR frame is a voice frame is comprised of:
  means for performing a carrier-to-interference (C/I) metric threshold test on the received AMR frame, and if it fails the C/I metric threshold test, the received AMR frame is classified as a NO_DATA frame; otherwise,
  means for channel decoding the received AMR frame as a voice frame;
  means for performing a CRC test on the channel decoded AMR frame, and if it passes, the received AMR frame is classified as a voice frame, otherwise the received AMR frame is classified as a NO_DATA frame.

28. The system of claim 23 wherein the step of determining whether the received AMR frame is a voice frame is comprised of:
  means for performing an inband bit correlation metric threshold test on the received AMR frame, and if it fails the inband bit correlation metric threshold test, the received AMR frame is classified as a NO_DATA frame; otherwise,
  means for channel decoding the received AMR frame as a voice frame; performing a CRC test on the channel decoded AMR frame, and if it passes, the received AMR frame is classified as a voice frame, otherwise the received AMR frame is classified as a NO_DATA frame.

* * * * *